United States Patent [19]

Wilkens

[11] Patent Number: 5,745,054
[45] Date of Patent: Apr. 28, 1998

[54] METHOD AND APPARATUS FOR CONFORMAL RUNWAY ALIGNMENT ON A HEAD UP DISPLAY

[75] Inventor: Dean Richard Wilkens, Glendale, Ariz.

[73] Assignee: Honeywell Inc., Minneapolis, Minn.

[21] Appl. No.: 751,444

[22] Filed: Nov. 18, 1996

[51] Int. Cl.$^6$ ................................................. G01C 21/00
[52] U.S. Cl. ..................... 340/972; 244/183; 340/979; 340/980; 364/428
[58] Field of Search ..................... 340/971, 972, 340/973, 974, 976, 979, 980; 364/424.012, 424.013, 424.06, 428; 73/178 T; 244/183, 184

[56] References Cited

U.S. PATENT DOCUMENTS

| | | |
|---|---|---|
| 3,521,227 | 7/1970 | Congleton et al. . |
| 3,573,827 | 4/1971 | DeBottom et al. . |
| 3,643,213 | 2/1972 | Yurasek et al. . |
| 3,648,231 | 3/1972 | Owens, Jr. et al. . |
| 4,104,612 | 8/1978 | Lowe .................. 364/428 |
| 4,316,252 | 2/1982 | Cooper ................ 364/428 |
| 4,368,517 | 1/1983 | Lovering ............. 364/428 |
| 4,454,496 | 6/1984 | Lowe .................. 340/980 |
| 4,533,999 | 8/1985 | Lambregts .......... 364/428 |
| 5,014,053 | 5/1991 | Nguyen ............... 340/971 |
| 5,343,395 | 8/1994 | Watts .................. 340/951 |

FOREIGN PATENT DOCUMENTS 1126839 6/1982 Canada .

OTHER PUBLICATIONS

Richard S. Bray, "A NASA–Ames Head–Up Display", NASA Ames Research Center, Jan. 10, 1994.

Primary Examiner—Brent A. Swarthout
Attorney, Agent, or Firm—Brian C. Downs; Ronald C. Champion

[57] ABSTRACT

An aircraft display system positions a synthetic runway which is properly aligned with a target runway even during crosswind approaches. The relative position of the target runway is computed in a manner which reduces the accumulated error associated with previous systems. The lateral deviation rate of the aircraft relative to the extended centerline of the target runway is computed from data provided by various aircraft navigation and sensor systems. A track error angle representative of the difference between the extended centerline of the runway and the ground track of the aircraft is computed from the lateral deviation rate and ground speed. Runway bearing relative to ground track is computed from the track error angle and lateral deviation angle. Compensating runway bearing relative to ground track with drift angle yields a runway bearing relative to aircraft heading which is useful for positioning a synthetic runway on a display. The preferred application is for head up display systems during instrument flight conditions but can also be used on head down displays to provide proper correlation between the synthetic runway and the flight path vector symbol.

18 Claims, 6 Drawing Sheets

$$\xi \text{RUNWAY ERROR} = \xi \text{CRS} + \xi \text{MAGDEV} + \xi \text{MAGVAR} +$$
$$\xi \text{HDG} + \xi \text{DISPLAY ALIGNMENT ERROR}$$

| | |
|---|---|
| $\xi$ CRS | ± 0.5° |
| $\xi$ MAGDEV + $\xi$ MAGVAR | ± 2.0° |
| $\xi$ HDG | ± 0.4° |
| $\xi$ DISPLAY ALIGN.ERROR | ± 0.2° |
| $\xi$ RUNWAY ALIGN.ERROR | ± 3.1° |

$\xi$ RUNWAY ERROR= $\xi$CRS + $\xi$MAGDEV + $\xi$MAGVAR + $\xi$HDG + $\xi$DISPLAY ALIGNMENT ERROR

| | |
|---|---|
| $\xi$ CRS | ± 0.0° |
| $\xi$ MAGDEV + $\xi$ MADVAR | ± 0.0° |
| $\xi$ HDG | ± 0.4° |
| $\xi$ DISPLAY ALIGN.ERROR | ± 0.2° |
| $\xi$ RUNWAY ALIGN.ERROR | ± 0.6° |

METHOD AND APPARATUS FOR CONFORMAL RUNWAY ALIGNMENT ON A HEAD UP DISPLAY

BACKGROUND OF INVENTION

The present invention relates generally to electronic displays and more specifically to the positioning of synthetic runway symbology on an aircraft display.

During instrument flight conditions (i.e. poor visibility) pilots must rely on instruments to navigate an aircraft to a destination, particularly during approach and land on a runway. Current systems use instrument landing systems (ILS), microwave landing systems (MLS), or satellite landing systems (SLS) to safely guide aircraft during approach to a runway. These systems traditionally use a deviation bar on a horizontal situation indicator (HSI) to indicate the lateral deviation of the aircraft from the approach course. Similarly, a glide slope deviation bar on the HSI is used to indicate vertical deviation of the aircraft from the glide slope. These systems are not intuitive and require a significant amount of pilot attention in order for the pilot to correctly interpret their meaning.

Recently, display systems have been introduced which attempt to make landing displays more intuitive for pilots. One approach has been to display a runway symbol (i.e. a synthetic runway) which represents the relative position and orientation of a target runway to a pilot. These display systems are typically found on head up displays, helmet mounted displays, and the like. A significant advantage of these systems is reduced pilot work load, reduced pilot fatigue, reduced pilot error, and hopefully, increased safety. Reducing pilot work load is particularly important during emergencies and other times of high pilot work load such as during approach and landing.

Prior art synthetic runway displays are intuitive, however, they are deficient in that the synthetic runway is often not properly aligned with the target runway. This is particularly distressing to pilots as the aircraft breaks out of the clouds and they find that the runway is not where the synthetic runway lead them to believe it was located. This has caused pilots to lose confidence in the systems. Further, these inaccuracies have forced the removal of synthetic runway symbols at low altitudes thus limiting their usefulness.

FIG. 1 illustrates a misaligned synthetic runway representative of the prior art. Illustrated is the view as seen looking through a combiner 10 (i.e. the display screen) of a head up display. Synthetic runway 13 is misaligned with target runway 14. Because this is a head up display, it is understood that target runway 14 is not symbology projected onto combiner 10, but is the actual target runway as viewed out the windshield of the aircraft.

The misalignment in FIG. 1 represents a 75 foot error at an altitude of 75 feet above runway 14. Synthetic runway 13 is significantly to the left of target runway 14. Flight path vector 12 is substantially in alignment with the synthetic runway 13. This is representative of prior art systems which erroneously attempt to align the synthetic runway 13 with flight path vector 12 as the aircraft nears runway 14.

Also shown in FIG. 1 are the errors which accumulate and are believed to contribute to synthetic runway misalignment in the prior art. Five errors contributing to misalignment include aircraft course (CRS) errors, magnetic deviation (MAGDEV), magnetic variation (MAGVAR), heading (HDG), and display alignment error. Together these errors can contribute errors in the range of plus or minus 3.1 degrees.

Aircraft navigation would be improved, pilot error and fatigue would be reduced, and aviation safety would be increased by a synthetic runway display system which closely aligns a synthetic runway with a target runway.

Clearly there exists the need for an aircraft display system which closely aligns a synthetic runway symbol with a target runway and thereby improves aircraft navigation, reduces pilot fatigue, and increases aircraft safety.

SUMMARY OF THE INVENTION

The invention discloses an aircraft display system which positions a synthetic runway so that it is properly aligned with a target runway during crosswinds. The target runway position relative to the aircraft is computed in a manner which substantially reduces accumulated error thereby improving alignment.

The lateral deviation rate of the aircraft relative to an extended centerline of the target runway is computed from data provided by various aircraft navigation and sensor systems. A track error angle, representative of the angle between the extended centerline of the runway and the ground track of the aircraft, is computed from the lateral deviation rate and ground speed. Runway bearing relative to ground track is computed from track error angle and lateral deviation angle. Compensating runway bearing relative to ground track with aircraft drift angle yields a runway bearing relative to aircraft heading which is useful for positioning a synthetic runway on a display. The preferred embodiment is implemented on a head up display and is intended for use during instrument flight conditions.

A key to the invention is a unique method of computing the position of the synthetic runway which eliminates many of the errors associated with the prior art. As discussed above and illustrated in FIG. 1, prior art systems accumulate the errors inherent in course, magnetic deviation, and magnetic variation, aircraft heading, and display alignment. These errors represent a cumulative error of plus or minus 3.1 degrees. The invention eliminates the errors associated with course, magnetic deviation, and magnetic variation thereby reducing cumulative errors from 3.1 degrees to approximately 0.6 degrees. The resulting improvement in synthetic runway alignment over the prior art is illustrated in FIG. 2.

FIG. 2 illustrates synthetic runway 13 only slightly misaligned from target runway 14. This misalignment represents a 15 foot error in alignment when the aircraft is 75 feet above runway 14. The 15 foot error is significantly improved over the 75 foot error of the prior art illustrated in FIG. 1.

The invention is applicable to most types of landing systems including instrument landing systems (ILS), global positioning system (GPS) landing systems, and microwave landing systems (MLS). Further, the invention is capable of many alternate embodiments depending on the configuration of the aircraft's navigation and sensor systems. The generic computations common to most embodiments are described below.

A significant step of the invention is the computation of lateral deviation rate. Lateral deviation rate is the vector component of aircraft speed perpendicular to an imaginary extended centerline of the target runway. Lateral deviation rate is an important step of the invention since it is a unique deviation from the prior art for computing the position of a synthetic runway. Several methods of computing lateral deviation rate are discussed in the Detailed Description section below.

Next, track error angle is computed from lateral deviation rate and aircraft ground speed. Ground speed is available from various aircraft systems. Track error angle represents the angular error or angular difference between the extended centerline of the target runway and the ground track of the aircraft. Using the invention, track error angle is computed without introducing errors associated with magnetic deviation or magnetic variation as taught in the prior art.

Runway bearing relative to ground track is then computed by subtracting lateral deviation angle from track error. Runway bearing relative to ground track is suitable for positioning a synthetic runway relative to a flight path vector symbol on the display. Subtracting drift angle from runway bearing relative to ground track yields runway bearing relative to aircraft heading which allows the synthetic runway to be positioned so as to align properly with the target runway. Drift angle (i.e. ground track—heading) is derived from data available from various aircraft systems.

The invention is enhanced by a complementary filter which combines runway bearing relative to aircraft heading with course error rate. The runway bearing computations described above provide very accurate low frequency data, however, they lack a high frequency response which is necessary for maintaining an accurate position of the synthetic runway. The invention improves the high frequency response by complementary filtering the low frequency response runway bearing signal with a high frequency response course error rate signal. The resulting conditioned runway bearing angle has an improved wide band frequency response.

The runway bearing signals generated in accordance with the invention are used to position a synthetic runway symbol in a conventional manner.

Therefore, objects of the invention are to provide improved synthetic runway symbology for aircraft displays, simplify aircraft navigation, reduce pilot workload, and increase aircraft safety.

A feature of the invention is a synthetic runway which is substantially aligned with the target runway during large cross winds.

Another feature of the invention is a synthetic runway which is substantially aligned when the aircraft is not moving directly toward the target runway.

An advantage of the invention is a synthetic runway in which pilots have confidence.

Another advantage of the invention is a synthetic runway which need not be removed at low altitude.

The significant features of the invention are illustrated in the figures and described more fully below.

DETAILED DESCRIPTION

Figure 1:
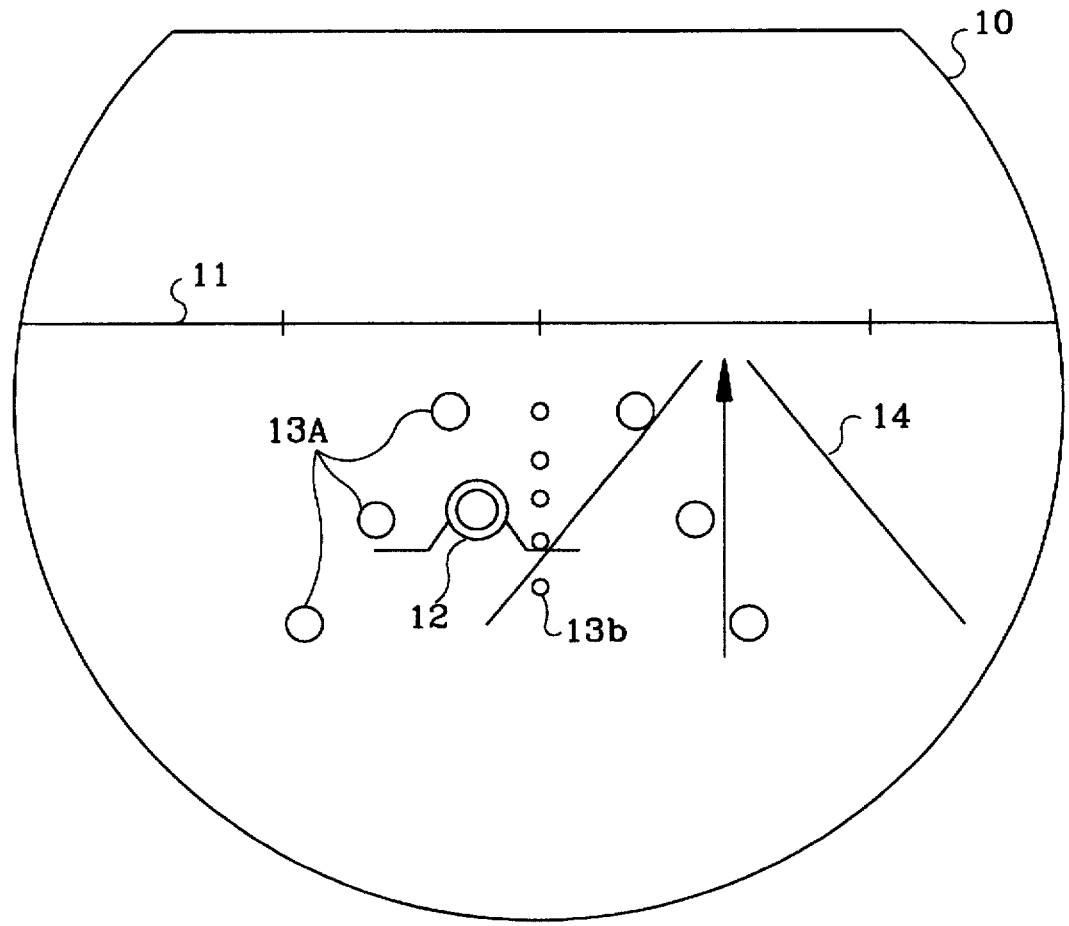
FIG. 1 illustrates alignment errors associated with prior art display systems.
Figure 2:
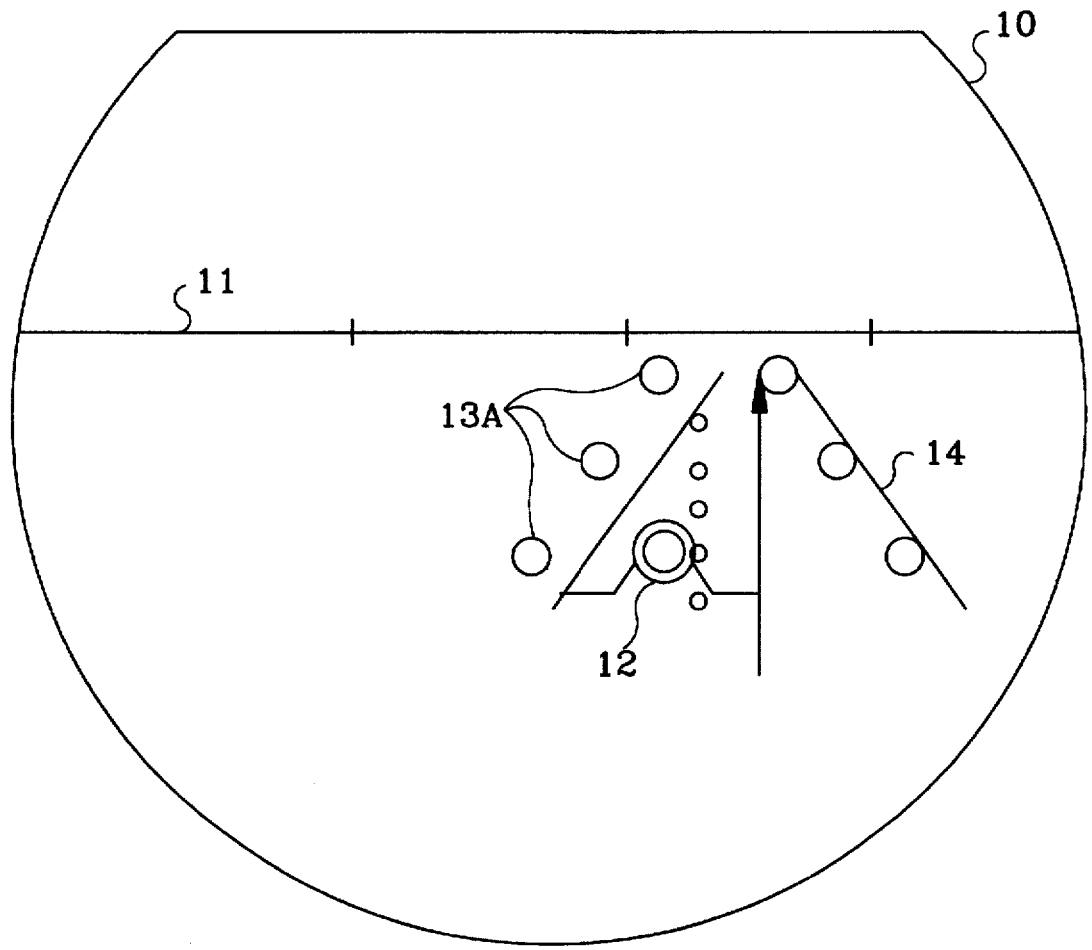
FIG. 2 illustrates the reduced alignment errors provided by the invention.
Figure 3:
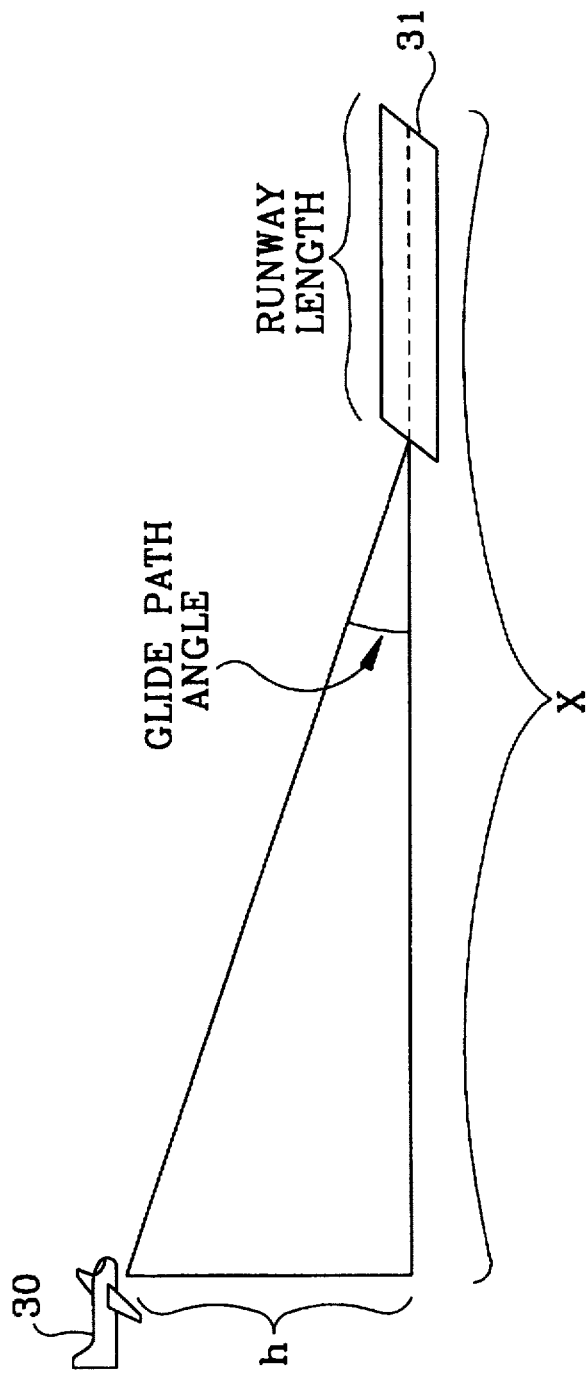
FIG. 3 is a diagram illustrating the computation of distance to the runway where an instrument landing system is in use.
Figure 4:
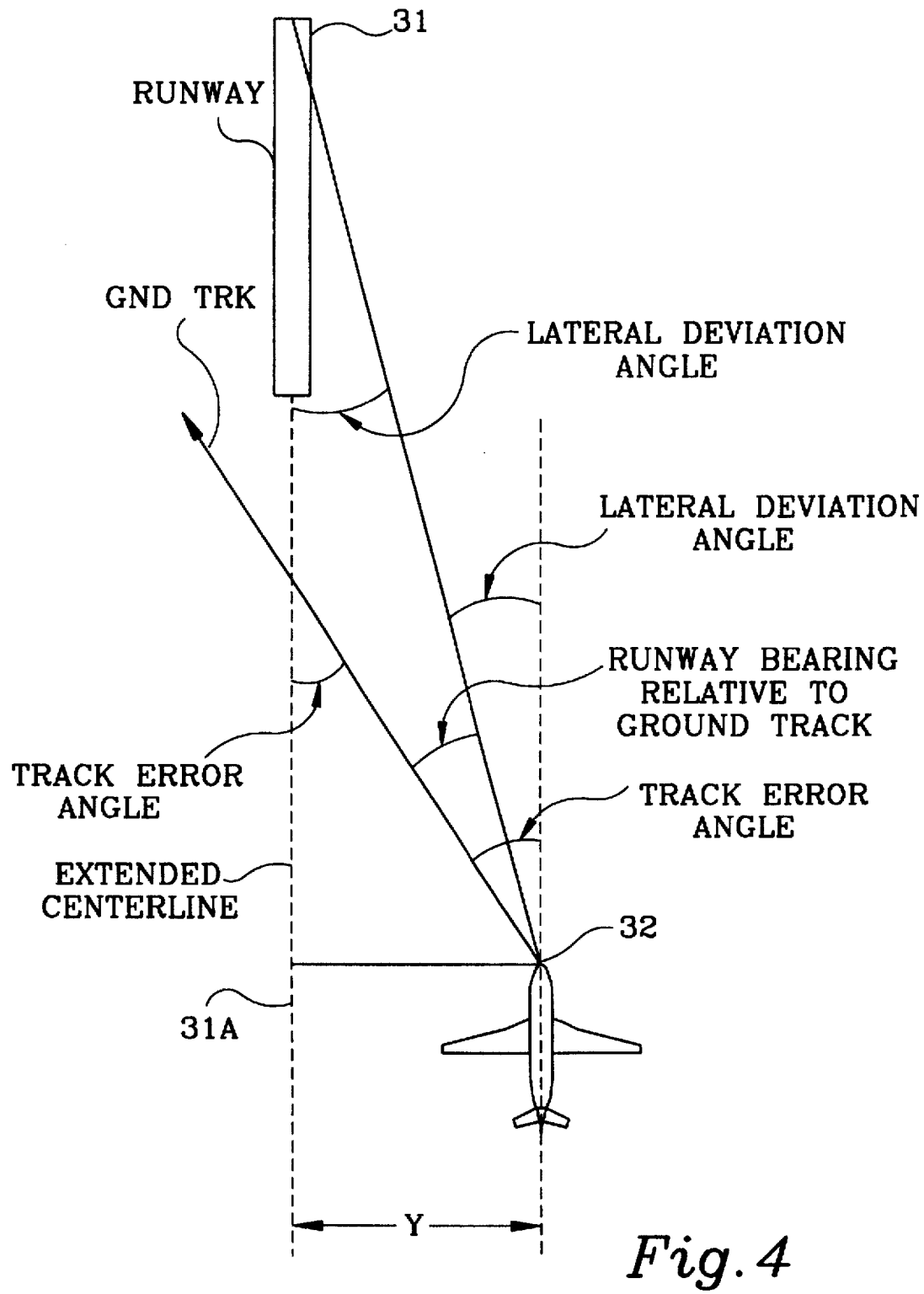
FIG. 4 is a diagram illustrating computation of runway bearing angle according to the invention.

FIGS. 3 and 4 are diagrams illustrating how runway bearing is computed according to the invention. The preferred embodiment is designed for use with an instrument landing system and is described below. Those skilled in the art understand that the invention may be adapted for use with any other landing system including satellite landing systems (e.g. GPS based landing systems) and microwave landing systems, and also with various aircraft navigation and sensor system configurations.

FIG. 3 illustrates the computation of distance to runway. Distance is calculated from the aircraft 30 to the far end of runway 31. The data required for this computation are altitude above the runway(h), glide path angle, and runway length. Once this information is available, distance to end of runway(X) is computed as follows:

$$X = h/\tan(\text{glide path angle}) + \text{runway length}$$

Altitude(h) is computed from altitude data provided by an air data computer and airport elevation data provided from either the pilot, an on board data base, or the like. Alternative sources of altitude data include radio altimeter systems, inertial reference systems, or systems utilizing global positioning system satellites.

Glide path angle is derived from the on board ILS system and runway specific glide path data provide by either an on board data base or the pilot. The ILS system provides deviation data representative of the angular deviation of the aircraft from the glide slope signal. The on board data base provides the angle of the glide slope angle of the specific approach being used. Adding the deviation angle and the glide slope angle yields the actual glide path angle of the aircraft.

Runway length may also be provided by either the pilot or an on board data base, however, the preferred embodiment merely uses an assumed 8,000 foot runway length which provides acceptable results.

FIG. 4 is a top view of a runway illustrating the computation of runway bearing. Shown in FIG. 4 are runway 31, the extended centerline 31A, aircraft position 32, lateral deviation Y, aircraft ground track, track error angle, localizer deviation angle (i.e. lateral deviation angle), and runway bearing relative to ground track (RBRGT).

Runway bearing is a key value for positioning a synthetic runway on a display. The data used to compute runway bearing include lateral deviation angle, aircraft ground speed, and drift angle. Once this data is available, runway bearing is computed as follows:

$$Y = X * \tan(\text{lat. dev. angle})$$

$$\dot{Y} = X * d(\tan(\text{lat. dev. angle}))/dt$$

$$\text{Track error angle} = \arcsin(\dot{Y}/\text{ground speed})$$

$$\text{RBRGT} = \text{track error angle} - \text{lat. dev. angle}$$

$$\text{RBRAH} = \text{RBRGT} - \text{drift angle}$$

where:
RBRGT is Runway Bearing Relative to Ground Track and
RBRAH is Runway Bearing Relative to Aircraft Heading All three inputs (i.e. lateral deviation angle, ground speed, and drift angle) may be derived from a variety of aircraft systems. The preferred embodiment uses an ILS system to provide localizer deviation which is used for the lateral deviation angle. Ground speed is provided by either a GPS based system or an inertial reference system (IRS).

Alternatively, airspeed data, such as from an air data computer, may be used as an approximation of ground speed.

Drift angle is computed as magnetic heading minus magnetic ground track. Those skilled in the art understand that drift angle may be computed in numerous ways using data from various aircraft systems.

Figure 5:
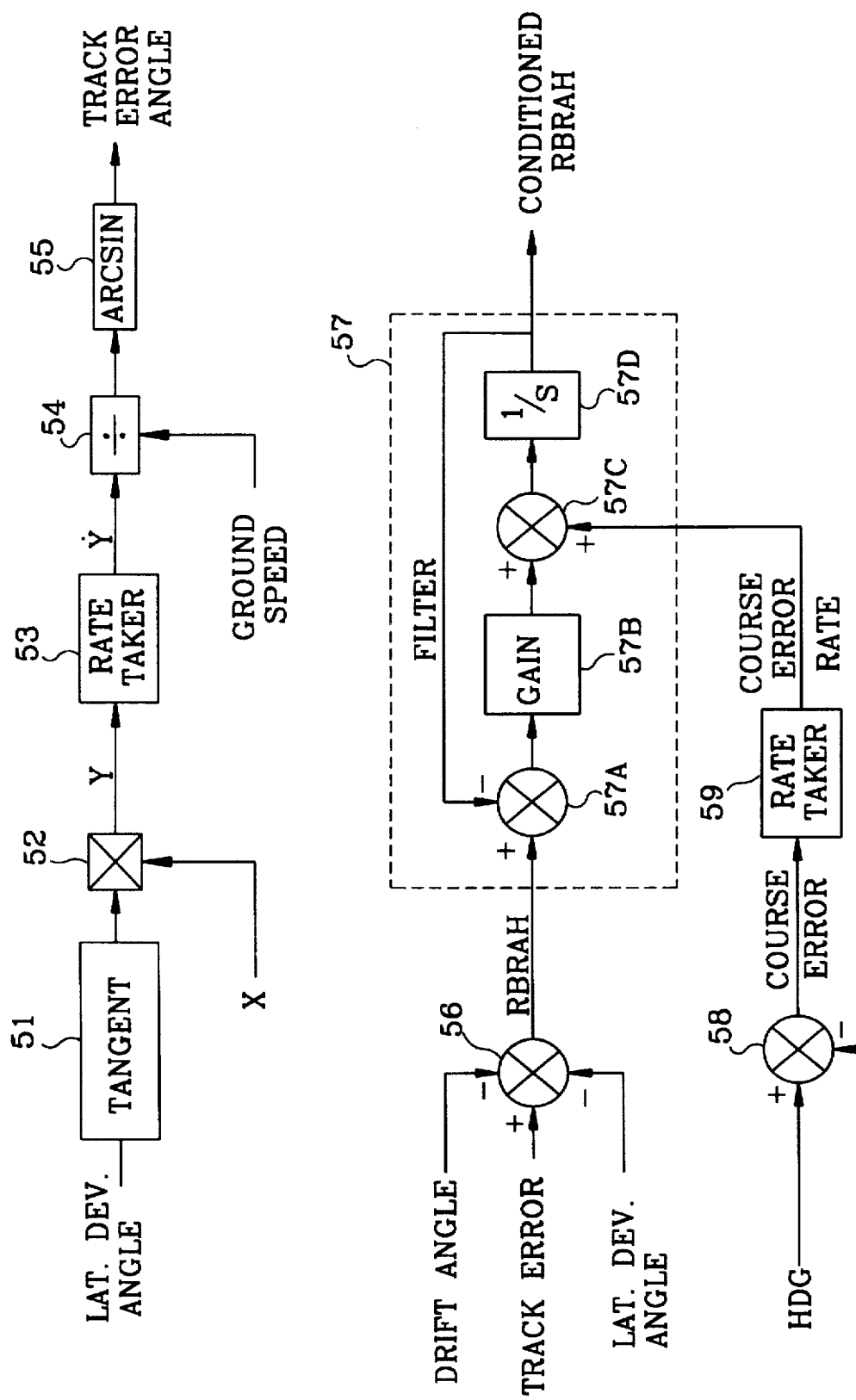
FIG. 5 shows a data processing diagram of the preferred embodiment.

FIG. 5 is a diagram showing the processing of data in the preferred embodiment. Computations are performed on a general purpose digital microprocessor.

Lateral deviation angle is provided to tangent function 51. Lateral deviation angle is typically small and therefore the small angle approximation of 0.0175 Radians/degree may be used to speed computations.

The output of tangent function 51 and distance, X, are input to multiplier 52 which yields lateral deviation, Y. Lateral deviation is processed by rate taker 53 to yield lateral deviation rate, Ẏ. Rate taker 53 of the preferred embodiment uses the function:

$$s/\tau s+1 \text{ where } \tau=1 \text{ sec}$$

to implement the rate taking function.

Divide function 54 divides lateral deviation rate, Ẏ, by ground speed and communicates the result to arcsin function 55. Arcsine function 55 processes the data to yield track error angle. Once again, a small angle approximation may be used to substituted for Arcsine function 55.

Summing junction 56 subtracts drift angle and lateral deviation angle from track error angle to yield runway bearing relative to aircraft heading (RBRAH).

Complimentary filter 57 combines RBRAH with course error rate to yield a wide band frequency response. Course error is computed at summing junction 58 by subtracting runway course from heading. Course error is then processed by rate taker 59 to yield a course error rate. Rate taker 59 of the preferred embodiment uses the function:

$$s/\tau s+1 \text{ where } \tau=0.2 \text{ sec}$$

to implement the rate taking function.

Complimentary filter 57 combines RBRAH with course error rate to produce a RBRAH signal with a wideband frequency response. The low frequency RBRAH signal is input to summing junction 57A where a feedback signal is subtracted from RBRAH. The output of summing junction 57A is RBRAH error which is multiplied by gain 57B before being input to summing junction 57C. Gain 57B of the preferred embodiment is implemented by the function:

$$1/\tau \text{ where } \tau=10 \text{ sec.}$$

Gain 57B establishes the crossover frequency of the complementary filter where the crossover frequency is:

$$\omega=1/\tau=0.1 \text{ radians or } 0.0159 \text{ Hz where } \omega=2\pi f$$

Summing junction 57C adds course error rate to the gain adjusted RBRAH error signal and communicates the result to integrator 57D. Integrator 57D of the preferred embodiment is implemented by the function:

$$1/s$$

The output of integrator 57D is the conditioned RBRAH signal which is suitable for positioning a synthetic runway symbol on a display in a conventional manner. The output of integrator 57D is also feedback into summing junction 57A where it is subtracted from RBRAH.

Figure 6:
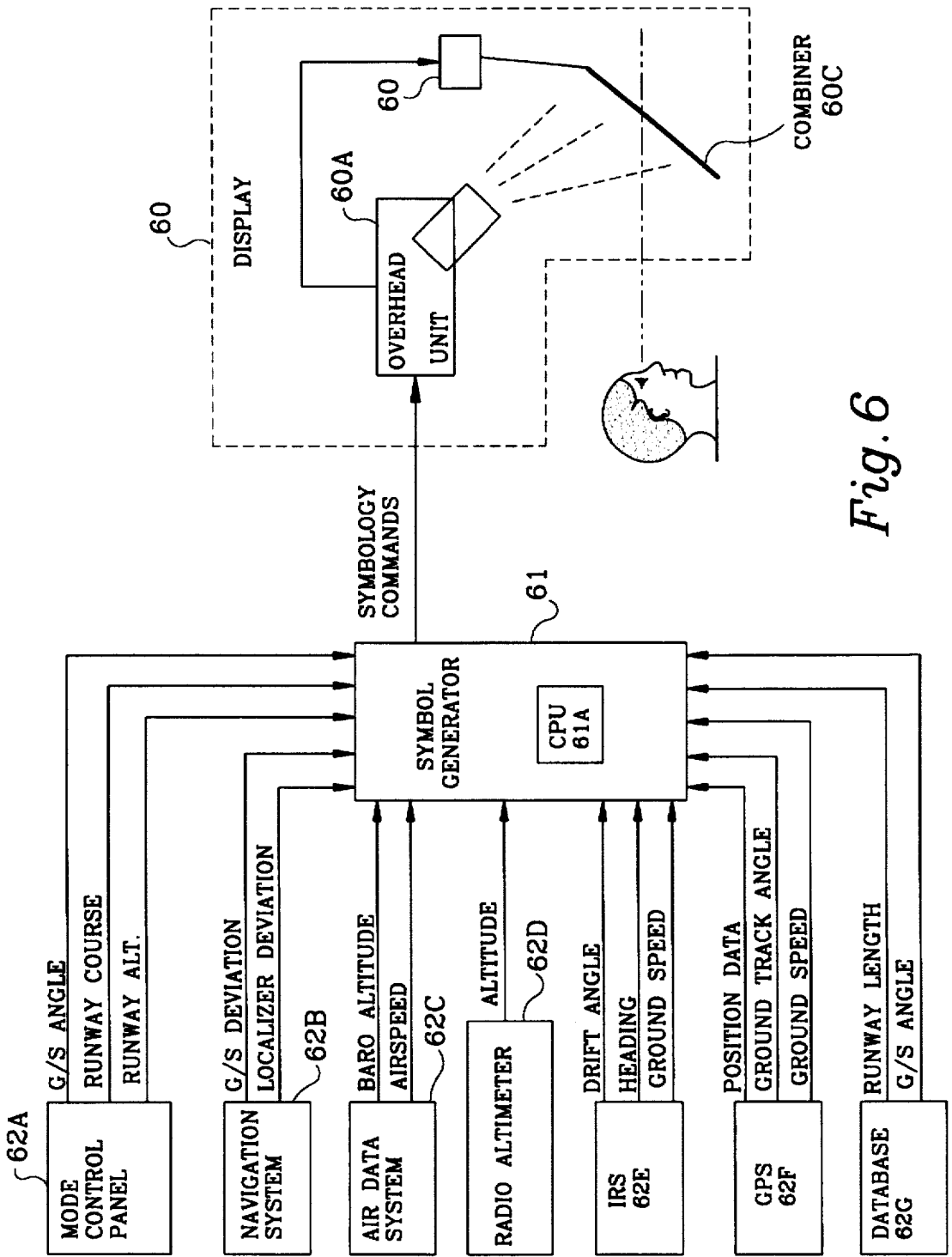
FIG. 6 show a block diagram of the invention interfaced and various aircraft systems.

FIG. 6 is a block diagram of the invention interfaced with various aircraft systems. Shown in FIG. 6 are display 60, symbol generator 61, and various aircraft systems including mode control panel 62A, navigation system 62B, air data system 62C, radio altimeter 62D, inertial reference system (IRS) 62E, and global positioning system (GPS) 62F.

Display 60 is illustrated as a head up display having an overhead unit portion 60A, a brightness control 60B, and a combiner 60C (also generically referred to as a display screen). Overhead unit 60A receives symbology commands from symbol generator 61. The symbology commands are converted into graphic symbols which are projected onto combiner 60C. Combiner 60C is positioned between the pilot 63 and the windshield of the aircraft so that the pilot can simultaneously view both the synthetic runway symbology and the outside world.

Symbol generator 61 generates the symbology commands which control what is displayed by display 60. Symbol generator 61 interfaces with various aircraft systems to receive the necessary data to compute runway bearing according to the invention. Computations are performed by a digital microprocessor or CPU 61A which is included in symbol generator 61.

The aircraft systems shown in FIG. 6 are representative of the variety of systems which may interface with the invention. Each system is described briefly below.

Mode control panel 62A permits an operator to manually enter data such as glide slope angle (G/S angle), runway altitude, and runway course. Navigation system (e.g. ILS) 62B provides glide slope deviation and localizer deviation data. Air data system 62C provides barometric altitude and airspeed data. Radio altimeter 62D provides radio altitude. Inertial reference system (IRS) 62E provides attitude and inertial data including drift angle, heading, and ground speed. GPS 62F provides data derived from satellite signals and differential GPS transmitters. GPS data includes position data, ground track angle, and ground speed. Database 62G provides runway length data and glideslope angle data.

The invention is adaptable to essentially any type of electronic display including, but not limited to helmet mounted displays, CRTs displays, flat panel displays, and plasma displays.

This description has been for descriptive purposes only and is not intended to limit the scope of the invention. Those skilled in the art recognize numerous alternate embodiments of the invention which deviate from the described embodiment but still perform the same work in substantially the same way to achieve substantially the same result and are therefore equivalent to the invention.

It is clear from the foregoing that the present invention represents a new and useful synthetic runway display method and apparatus.

The embodiments of an invention in which an exclusive property or right is claimed are define as follows:

1. A display system for an aircraft comprising:
   a) an instrument landing system providing localizer deviation data and glideslope deviation data representative of the deviation of said aircraft from a selected ILS flight path;
   b) means for providing altitude data representative of the altitude of said aircraft above a target runway;
   c) a database providing runway length data;
   d) means for providing ground speed data representative of the ground speed of said aircraft;

e) means for computing a lateral deviation rate of said aircraft relative to the extended centerline of said target runway from said localizer deviation data, said glideslope deviation data, said altitude data, and said runway length data;

f) means for computing a track error angle from said lateral deviation rate and said ground speed data; and, g) means for computing runway bearing relative to ground track from said track error angle and said localizer deviation data; and h) means for displaying symbology indicative of said runway bearing relative to ground track on a display screen.

2. The display system according to claim 1 further comprising:

a) means for providing drift angle data representative of the difference between ground track and heading of said aircraft; and, b) means for computing a runway bearing relative to aircraft heading signal from said runway bearing relative to ground track and said drift angle data.

3. The display system according to claim 2 further comprising:

a) means for providing course error rate data representative of the rate of change between aircraft heading and runway course; and, b) a filter providing a conditioned relative bearing to runway signal generated from said runway bearing relative to aircraft heading signal and said course error rate data.

4. The display system according to claim 3 wherein said means for providing course error rate data includes, a) means for providing aircraft heading data, and, b) means for providing runway course data.

5. A method of positioning runway symbology on a display of an aircraft, said method comprising the steps of:

a) providing navigation and inertial data representative of the status of said aircraft, said data including,
1) lateral deviation data representative of the lateral deviation of said aircraft relative to the extended centerline of a target runway,
2) ground speed data representative of the ground speed of said aircraft, and,
3) lateral deviation angle data representative of an angular lateral deviation of said aircraft relative to the centerline of said runway;

b) computing a lateral deviation rate of said aircraft relative the centerline of said target runway from said navigation and inertial data;

c) computing a track error angle, representative of the angular difference between the ground track of said aircraft and the extended centerline of said runway, from said lateral deviation rate and said ground speed data;

d) computing a runway bearing relative to ground track angle from said track error angle and said lateral deviation angle; and, e) generating symbology commands representative of a synthetic runway symbol positioned in accordance with said runway bearing relative to ground track angle.

6. The method of positioning runway symbology according to claim 5 wherein the step of generating symbology commands is preceded by the steps of:

a) providing drift angle data representative of a drift angle of said aircraft; and, b) computing a runway bearing relative to aircraft heading from said runway bearing relative to ground track and said drift angle data.

7. The method of positioning runway symbology according to claim 6 wherein the step of generating symbology commands is preceded by the steps of:

a) providing a course error rate signal representative of the difference between the heading of said aircraft and the runway course of said target runway; and, b) complimentary filtering said runway bearing relative to aircraft heading (RBRAH) with said course error rate signal to produce a conditioned RBRAH signal which has wideband frequency response.

8. The method of positioning runway symbology according to claim 5 wherein the step of generating symbology commands includes generating said symbology commands representative of a runway positioned relative to a flight path vector symbol.

9. The method of positioning runway symbology according to claim 5 wherein the step of generating symbology commands is preceded by the steps of:

a) providing course error rate data; and, b) complimentary filtering said runway bearing relative to ground track with said course error rate data.

10. The method of positioning runway symbology according to claim 5 wherein the step of computing a lateral deviation rate is preceded by the step of providing a distance to runway signal representative of the distance from said aircraft to a point near the far end of said target runway and wherein said lateral deviation rate is computed using said distance to runway signal.

11. The method of positioning runway symbology according to claim 10 wherein the step of computing a distance to runway signal includes the steps of:

a) providing altitude data representative of the altitude of said aircraft above said runway;

b) providing glide path angle data representative of the glide path angle of said aircraft;

c) providing runway length data; and, d) computing said distance to runway signal from said altitude data, said glide path angle data, and said runway length data.

12. The method of positioning runway symbology according to claim 5 wherein said display is a head up display.

13. An apparatus for positioning synthetic runway symbology on a display screen of an aircraft, said apparatus comprising:

a) means for generating a lateral deviation rate signal representative of the rate of lateral deviation of said aircraft relative to the extended centerline of a target runway;

b) means for generating a speed signal indicative of the ground speed of said aircraft;

c) means for computing a track error angle from said lateral deviation rate signal and said speed signal;

d) means for generating a lateral deviation angle signal representative of the lateral angular deviation of said aircraft relative to the centerline of said target runway, said lateral deviation angle having a vertex near the far end of said target runway; and, e) means for computing a runway bearing relative to ground track signal from said track error angle and said lateral deviation angle signal; and f) means for positioning synthetic runway symbology on said display screen responsive to said runway bearing relative to ground track.

14. The apparatus for positioning synthetic runway symbology according to claim 13 further comprising:
   a) means for providing a course error rate signal indicative of the rate of angular change of heading of said aircraft; and,
   b) means for complimentary filtering said runway bearing relative to ground track signal with said course error rate signal.

15. The apparatus for positioning synthetic runway symbology according to claim 13 further comprising:
   a) means for generating a drift angle signal indicative of the angular difference between the heading of said aircraft and the ground track of said aircraft; and,
   b) means for computing a runway bearing relative to aircraft heading from said runway bearing relative to ground track signal and said drift angle signal.

16. The apparatus for positioning synthetic runway symbology according to claim 15 further comprising:
   a) means for computing a course error rate signal indicative of the rate of angular change of the heading of said aircraft; and,
   b) filter means for complimentary filtering said runway bearing relative to aircraft heading with said course error rate signal.

17. The apparatus for positioning synthetic runway symbology according to claim 13 further comprising means, in communication with said display screen, for generating symbology commands representative of aligned runway symbology positioned on said display screen in accordance with said runway bearing relative to ground track signal.

18. The apparatus for positioning synthetic runway symbology according to claim 17 wherein said display screen is a head up display.

* * * * *